(12) United States Patent
McCarty

(10) Patent No.: US 7,426,745 B2
(45) Date of Patent: Sep. 16, 2008

(54) METHODS AND SYSTEMS FOR TRANSPARENT DATA ENCRYPTION AND DECRYPTION

(75) Inventor: Richard James McCarty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 866 days.

(21) Appl. No.: 10/422,667

(22) Filed: Apr. 24, 2003

(65) Prior Publication Data

US 2004/0230792 A1    Nov. 18, 2004

(51) Int. Cl.
*H04L 9/00* (2006.01)
*H04L 9/32* (2006.01)

(52) U.S. Cl. .......................................... 726/1; 713/193
(58) Field of Classification Search .................. 713/153
See application file for complete search history.

(56) References Cited

U.S. PATENT DOCUMENTS 6,314,190 B1 * 11/2001 Zimmermann .............. 380/282
6,678,828 B1 *  1/2004 Pham et al. .................. 726/2
6,937,730 B1 *  8/2005 Buxton ....................... 380/241
6,981,141 B1 * 12/2005 Mahne et al. ............... 713/165
7,152,165 B1 * 12/2006 Maheshwari et al. ........ 713/193

* cited by examiner

*Primary Examiner*—Nasser Moazzami
*Assistant Examiner*—Brandon S Hoffman
(74) *Attorney, Agent, or Firm*—Duke W. Yee; Jeffrey S. LaBaw; Wayne P. Bailey

(57) ABSTRACT

A method and system for transparently encrypting (and decrypting) sensitive data stored in a directory (or other database) is provided. Sensitive data, a password for example, may be required by a client in a distributed data processing environment. When the database entry is created, the sensitive data received from a user, or more generally, a client, may be encrypted, and saved in the directory entry in encrypted form. Encryption of sensitive data may be performed in accordance with a predetermined set of policies. When the sensitive information is needed, it may be selectively delivered in encrypted or unencrypted form based on a policy in the set. Policies may include criteria external to the database, and interfaced to the database via a policy engine.

6 Claims, 7 Drawing Sheets

METHODS AND SYSTEMS FOR TRANSPARENT DATA ENCRYPTION AND DECRYPTION

TECHNICAL FIELD

The present invention relates, in general, to data processing systems, and in particular to encrypted data in the context of a directory service.

BACKGROUND INFORMATION

A directory service provides a central repository for information about systems applications and users available in a data processing system, particularly a multi-user, networked data processing environment. The directory service provides a mechanism for managing users and computing resources. Directory services permit the centralization of network and system administration. Using a directory service, information about all the users, such as names, passwords and preferences, and all the information about resources on the network can be maintained in a single location. Additionally, user access to the computing resources, and the associated access control measures may also be incorporated in the directory service. For example, the directory service may define the relationships and access privileges between the computing resources and the users of the data processing system.

A directory is a specialized database that contains entries. Entries are composed of a collection of attributes. An entry represents an object of interest in the system, for example, users, servers, printers, applications, etc. The attributes contain information about the corresponding object.

Certain data may be sensitive for example personally identifiable information (PII) subject to privacy regulations, and thus, the directory entries containing such information should be protected against compromise. Such data may be encrypted prior to storing in the directory, and then decrypted by a receiving application on retrieval from the directory. Such a system requires that encryption keys must be maintained by both the storing and receiving entities. Alternatively, data may be encrypted as it is stored and decrypted when it is retrieved from the directory. In the former instance, because the data is communicated in encrypted, or ciphertext, form (ciphertext will be used herein to refer to data that is encrypted, although it need not be "text" per se) the connection between the directory server and the client may be an unsecured connection. Alternatively, if the client and server communicate over a secure connection, the sensitive data may be transferred in cleartext, that is, unencrypted form.

To accommodate both alternatives and maintain integrity of sensitive data stored in the directory, there is a need in the art for systems and mechanisms for selectively maintaining data in encrypted form on an object (or attribute) basis. Additionally, there is a need in the art for mechanisms to control which data is stored in encrypted form and which recipients can retrieve the data in unencrypted form and which can retrieve the data in unencrypted form.

SUMMARY OF THE INVENTION

The aforementioned needs are addressed by the present invention. Accordingly, in one embodiment, a method for transparent data delivery encryption and decryption may be performed. The method includes determining if, in response to a policy corresponding to requested data, a receiver is a trusted client. If the requested data is stored in encrypted form, delivering the requested data in unencrypted form if the client is trusted. The requested data in encrypted form if the client is untrusted.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

A method and system for transparently encrypting (and decrypting) sensitive data stored in a directory (or other database) is provided. Sensitive data, personally identifiable information (PII), may be required by a client in a distributed data processing environment. When the directory (or other database) entry is created, the sensitive data received from a user (or more generally a client) may be encrypted, and saved in the directory entry in encrypted form. Encryption of sensitive data may be performed in accordance with a predetermined set of policies. When the sensitive information is needed, it may be retrieved from the directory entry, decrypted and forwarded to the client. Alternatively, the sensitive information may be delivered to the client in encrypted form. Again, the form of delivery of the sensitive information may be determined in accordance with the aforementioned set of policies.

In the following description, numerous specific details are set forth such as specific protocols to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been admitted inasmuch as such details are not necessary to obtain a complete understanding of the present invention and are within the skills of persons of ordinary skill in the relevant art.

Figure 1:
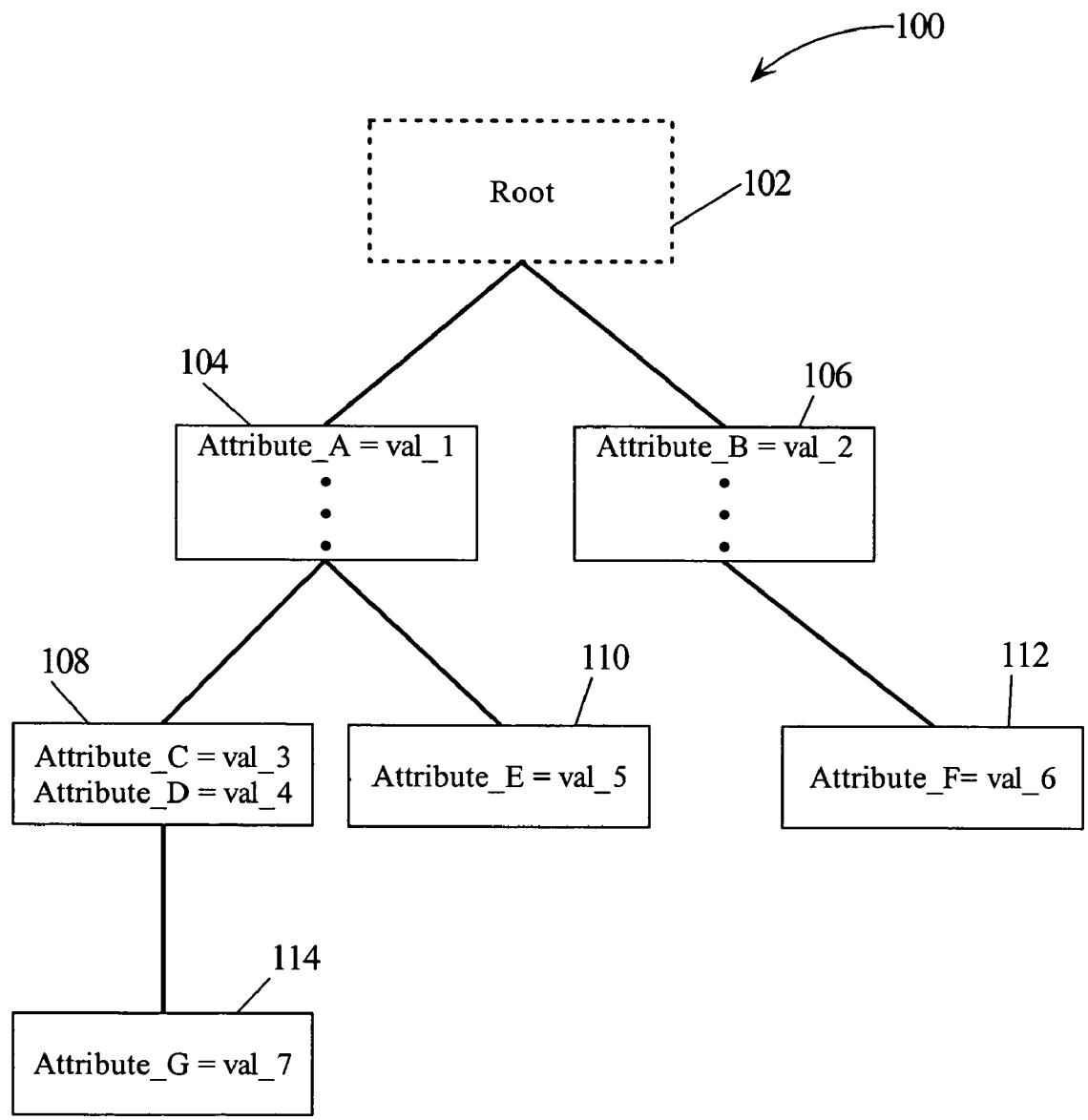
FIG. 1 schematically illustrates an exemplary directory information tree.

Refer now to the drawings wherein depicted elements are not necessarily shown to scale and wherein like or similar elements are designated by the same reference numeral through the several views. FIG. 1 schematically illustrates an exemplary directory information tree. As previously mentioned, a directory is a class of database which may be used to manage users and resources in a distributed data processing environment. A directory may have a logical organization as a hierarchical, tree-like structure. Directory information tree 100 of FIG. 1 illustrates such a hierarchical tree-like structure for an exemplary (and simplified) directory. One of ordinary skill in the art would appreciate that an embodiment of a directory would realistically be expected to include more entries, reflecting the numbers of users and resources associated with the data processing system for which the directory is implemented.

Directory information tree 100 may be organized in accordance with the Lightweight Directory Access Protocol (LDAP). (LDAP is an open industry standard defining the transport and form of messages used to access data in an X.500-like directory. The specifications for LDAP (v.3) may be found in Request for Comments (RFC) 2251. X.500 is a directory services standard promulgated by the International Organization for Standardization (ISO) as ISO 9594).

A directory is composed of a set of entries, each entry of which serves as a container for information about an object corresponding to the entry. The information about the object contained in an entry may be referred to as an attribute. In the LDAP context, attributes are stored as an attribute type and value. (An attribute type may also be referred to as an attribute name, and the terminology may be used interchangeably for the purposes herein.) In directory information tree 100, a set of entries are illustrated. Entry 102, the root entry, is conceptual in LDAP and does not actually exist (thus is illustrated by the "dashed" box). Directory information tree 100 includes a plurality of entries, 104-114 which have associated therewith attributes of the object corresponding to each entry. As will be discussed further hereinbelow, entries may correspond to objects that make up an entity for which the directory service is implemented. As previously discussed, such objects may represent persons, that is users, data processing systems and resources therein associated with a distributed data processing environment. In a directory service using LDAP, attributes have the form "attribute_name=attribute_value." Thus, entry 104 may include a set of attributes including attribute_A=val_1. Similarly, entry 106 includes attribute_B=val_2, entry 108 includes attribute_C=val_3 and attribute_D=val_4, entry 110 includes attribute_E=val_5, entry 112 has attribute_F=val_6, and entry 114 has attribute_G=val_7. Note that the attributes associated with particular entries need not necessarily be unique, that is, different entries may have some attributes which are of the same type as other entries, and may need not have different values, depending on the particular object represented by the entry.

Attributes for a particular entry may be accessed in accordance with the LDAP by a query against the directory. Entries in a directory information tree, such as directory information tree 100, FIG. 1, are specified by a distinguished name (DN) of the entry. The distinguished name is a sequence of relative distinguished names (RDN). Each RDN is derived from the attributes of the directory entry. Commonly, the RDN of a particular entry is a selected one of the attributes that is particularly specified as the RDN when the entry is created. For example, assuming for purposes of illustration, that entry 110 has only a single attribute, attribute_E, the RDN of entry 110 would be attribute_E=val_5. Additionally, assuming that the RDN of entry 104 is attribute_A=val_1, the DN of entry 110 would be attribute_A=val_1, attribute_E=val_5.

The types of objects represented in a particular directory, for example, persons, data processing systems, resources, etc., are defined by a form of netadata called a schema. A schema defines the types of objects that can be stored in the directory, and also lists the attribute types of each object type and whether the attributes are required or optional. To organize the information stored in directory entries, a schema defines object classes. Every entry in a directory has an object class associated with it. A directory entry is an instantiation of an object class in accordance with the particular schema defining the directory implementation. Objects in a schema can be derived from other objects. In other words, an object class may be defined as a subclass of another object class. The subclass object inherits the attributes of the superior class. Thus, referring to directory information tree 100, the types of objects corresponding to each of entries 104-114 is defined by the schema for the directory. Additionally, entry 112, for example, inherits attribute_B and its value, val_2, from entry 106. A schema that may be used in conjunction with the present invention is described in a commonly owned co-pending U.S. Patent application entitled "Open Architecture Global Sign-On Apparatus and Method Therefor," Ser. No. 09/594,518, which is hereby incorporated herein by reference. A portion of the schema described in the aforementioned U.S. Patent application will be discussed hereinbelow in conjunction with FIG. 5.

Figure 2:
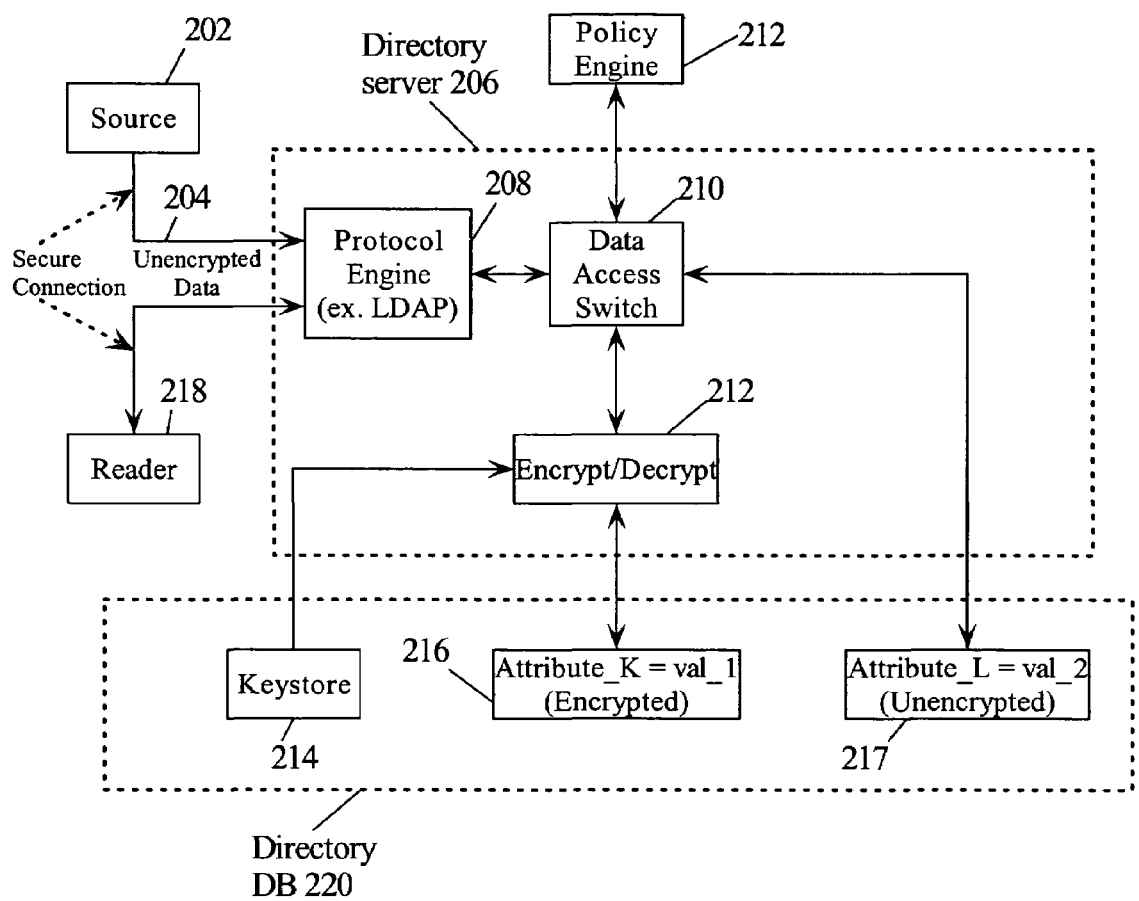
FIG. 2 illustrates, in block diagram form, a data processing architecture for a methodology for selective transparent data encryption in accordance with the present invention.

Refer now to FIG. 2, illustrating a logical block diagram of a transparent encryption architecture in accordance with the present inventive principles. A source 202 of data to be stored in an entry in a directory transmits the data, embedded in a directory message, via a secure connection 204. A source might be, for example, a user setting up an account for accessing distributed data processing services in a multi-user distributed data processing environment. Another example might be a system administrator establishing access control lists to manage the access by groups of users to distributed data processing resources on a network (access control lists, or "ACLs" are lists of authorizations that may be attached to objects and attributes in a directory). At least a portion of the data in the message may be sensitive data. Sensitive data, if compromised, may be detrimental to system security. Because connection 204, is for the purposes herein, assumed to be secure, sensitive information may be sent as cleartext in the directory message.

Messages are passed to directory server 206 which includes at protocol engine 208 for processing directory access messages. Protocol engine 208 may implement the LDAP, or alternatively, other directory access protocols, including the Directory Access Protocol (DAP), the access protocol defined in the X.500 directory service. (An LDAP server essentially may be a front end, or gateway, for an X.500 server which maintains the directory itself. Alternatively, an LDAP server may be a stand alone system that maintains the directory itself. The distinction between these particular implementations of an LDAP server are not germane to the present invention; the invention principles herein may be adapted to either implementation.) As shown in FIG. 2, the directory server 206, in an LDAP implementation, may be viewed as a stand alone LDAP server. Nevertheless, an embodiment in which the LDAP server serves as a gateway to an X.500 server may be provided in accordance with the present inventive principles by including the appropriate, e.g. DAP protocol engine in directory server 206, and to effect any transport protocol translations that may be required between the LDAP and X.500 services.

Data to be entered into the directory is passed from protocol engine 208 to data access switch 210. Data access switch 210 may be controlled by policy engine 212. A set of policies may be provided which serve to control the encryption and decryption of data stored in the directory. A policy, may refer to a rule which may be evaluated against some condition. For the purposes herein, a policy may reflect relationships or imperatives. For example, a rule may say that only managers may have access to an unencrypted version of a particular value for their own direct reports. Further, a policy can determine not only whether an attribute may be accessed, but also a manner of accessing an attribute and transformations that may be applied to the data. A policy engine may implement a decision making function, which evaluates data access requests against policies. Thus, policies may be used to specify which sets of data stored in the directory are specified as sensitive, and therefore subject to storage in an entry in the directory in encrypted form. Additionally, policies may operate to identify or select, sensitive data on an attribute-by-attribute basis and may also specify that particular objects themselves are sensitive, whereby all of the attributes of corresponding directory entries are selected for storage in encrypted form.

If the data is sensitive, data access switch 210 forwards the data to encryption/decryption block 212, which encrypts the data using an encryption key retrieved from key store 214.

The data access component may be supplemented with an encryption function. Keys are used to encrypt data, and may be stored in a keystore, a file formatted for the purpose. Commercially available encryption packages, such as the IBM GS Kit, from IBM Corp., Armonk, N.Y., may be used in conjunction with the present invention. Encryption block 212 may select the keys used for the encryption of particular attributes based upon a policy decision, such as a recipient-specific key may be selected. For example, a client may store an attribute, and by policy, the attribute is to be encrypted and stored using a client-specific key (which is installed in the keystore). The client, once the data is stored, can retrieve the data in unencrypted form. In an alternative environment, the client stores an attribute, and by policy, the attribute must be encrypted and stored using a key that is specific to the client user's manager. The client, once the data is stored, can retrieve the data only in encrypted form, while the client's manager can retrieve the data in unencrypted form. More generally, the client stores an attribute, and by policy, the attribute is stored in encrypted form, using a client-specific key. Any user who is otherwise entitled to query the attribute will receive it in encrypted form, which will require knowledge of the "owner's" key to decrypt. If the "owner" queries for this attribute, it will be received in unencrypted form. Note that these examples are not necessarily exhaustive and are intended to illustrate the principles of the present invention. Alternative policy implementations would fall within the spirit and scope of the present invention.

The encrypted data is then stored in a corresponding directory entry 216 as an encrypted attribute value belonging to an attribute of the object instantiated by entry 216. If, in accordance with the predetermined policy set, the attribute is not sensitive and attribute values are to be stored in cleartext form, data access switch 210 forwards the attribute value to the corresponding entry 217 in cleartext form, that is, the encryption/decryption block is bypassed. Note that key store 214 and entries 216 and 217 may be a portion of the directory database, shown as directory database 220 in FIG. 2. Additionally, policy engine 212 has been illustrated as external to the directory server, however, in an alternative embodiment of the invention, policy engine 212 may be included in directory server 206. Those of ordinary skill in the art would recognize that such alternative implementations fall within the spirit and scope of the present inventive principles. Moreover, the policy set may include criteria external to the directory and interfaced to the directory via the policy engine. For example, a criterion might be an IP (Internet Protocol) address that may be used by the policy engine to identify a secure (or unsecure) network.

Figure 3:
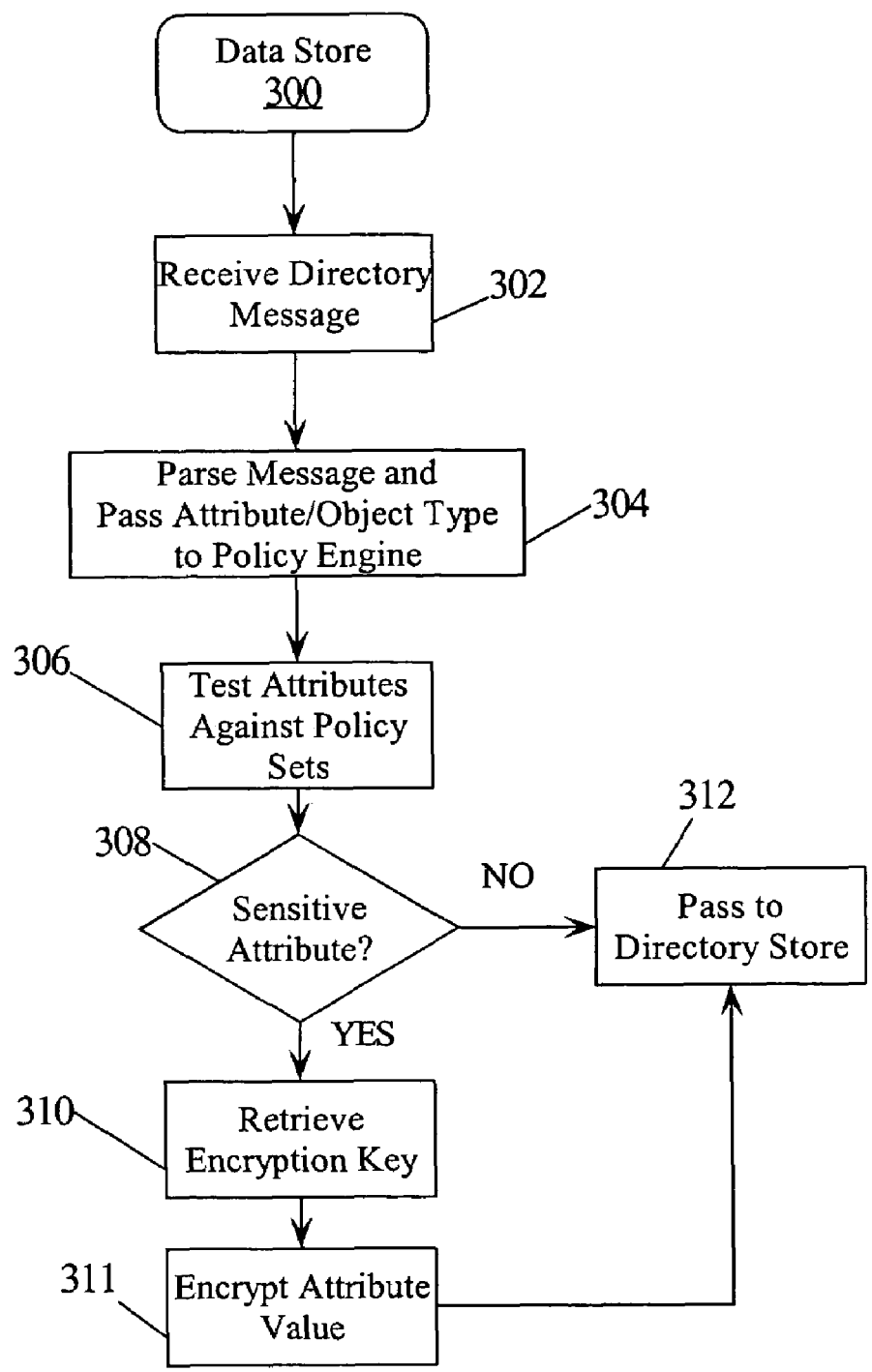
FIG. 3 illustrates in flow chart form a methodology for transparent data encryption in accordance with the present inventive principles.

The operation of a data store using transparent data encryption is illustrated, in flowchart form, in FIG. 3. Data store process 300 may be performed by directory server 206 in conjunction with policy engine 212 as discussed in conjunction with FIG. 2. Note that the flowcharts provided herein are not necessarily indicative of the serialization of operations being performed in an embodiment of the present invention. Steps disclosed within these flowcharts may be performed in parallel. The flowcharts are indicative of those considerations that may be performed to execute transparent data encryption in a directory service.

In step 302, directory message is received and in step 304, the data types, that is the object type and attribute types (or equivalently attribute names) in the message are passed to a policy engine. These are tested in the policy engine against a predetermined policy set, step 306. In this way, attribute types that are specified as sensitive in the policy set may be determined. If, in step 308 an attribute type that is set by policy to be sensitive, the attribute value is encrypted, and passed to the directory store. In step 310, the encryption/decryption key is retrieved from a keystore and the attribute value encrypted, in step 311. The attribute value, in encrypted form, is passed to the directory store in step 312.

Conversely, if in step 308, the attribute is not sensitive, the value, in cleartext form, is passed to the directory store. It would be understood by those of ordinary skill in the art that a directory message may contain multiple attribute/value pairs (or n-tuples for attributes that may be multivalued) and process 300 may repeat steps 308-312 for each attribute in the message.

Returning to FIG. 2, retrieval of attribute values in response to a request from a reader 218 will now be considered. Reader 218 may be a user or system administrator or a system resource retrieving an attribute value. Alternatively, reader 218 may be a system source that is a target of a directory message as discussed in conjunction with FIG. 5, below.

Data may be retrieved, based on particular policies in the policy set, in either encrypted or unencrypted form. Before discussing a methodology for data, general exemplary retrieval scenarios will be described. Consider an environment that uses a third-party "broker" that intermediates exchanges of directory data between various entities. (The exchange of personally identifiable medical data may be exchanged between providers in this way.) The broker may be entitled (and may even need) to see certain attributes in unencrypted form, yet other attributes may be deemed sensitive even for the broker. However, the broker still has the ability to transfer the all of the data to the recipient, but does not have the ability to observe the sensitive values—only the recipient can see them in unencrypted form. The broker retrieves the sensitive attribute from the directory, and by policy, is entitled to receive the data, but only in encrypted form. The recipient retrieves the cleartext by decrypting the encrypted data.

An environment in which policy determination may selectively deliver encrypted or cleartext sensitive data is the delivery of sensitive data over a network. If a client is connected from a trusted network, by policy, the attribute may be returned in unencrypted form. Otherwise, the data is returned in encrypted form. For example, the policy engine might evaluate the IP (Internet Protocol) address of the client against a rule, and decide that because it is not from a trusted network, though the client is otherwise entitled to the data, the attribute can only be sent in encrypted form because of the risk of compromise. For example, at a supermarket, a manager using a checkout stand terminal may only be able to retrieve encrypted values of certain supplier data attributes. If the terminal itself had a built-in decryption capability, by using an explicit "override" at the terminal, the manager could then see the sensitive data in plain form. However, if the same user executes the same query from an interior office terminal, the directory will provide unencrypted values with no override required.

Figure 4:
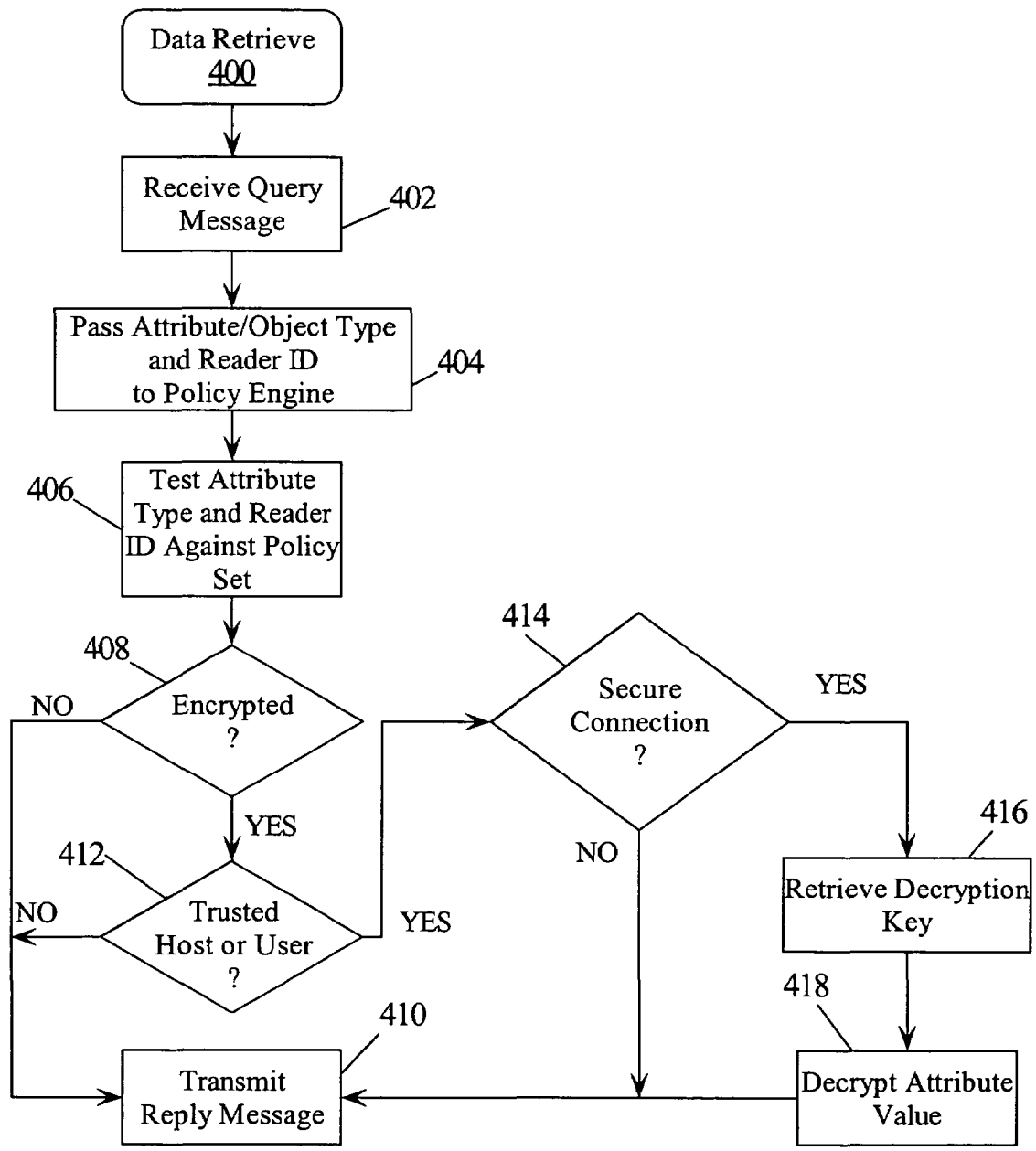
FIG. 4 illustrates, in flowchart form, a methodology for transparent data decryption in accordance with the principles of the present invention.

Referring now to FIG. 4, data retrieval methodology 400 in accordance with an embodiment of the present invention is illustrated in flow chart form. In step 402, a directory query message is received. In step 404, the object type, the attribute type and reader identifier (ID) is passed to the policy engine, and in step 406, the attribute type and reader ID are tested against the policy set, in similar fashion to step 306, FIG. 3.

Step 408 is a decision block which branches in accordance with the form of the value of the requested attribute value. If the attribute is stored in the directory in cleartext, the value is passed in a reply message to the receiver, step 410. Conversely, if in step 408, the attribute value is encrypted, in step 412 it is determined if, based on the policy set, the receiver is a trusted host or trusted user (collectively a trusted client). If, in accordance with the policies, the host or user is not indicated to be a trusted host/user, the attribute value is embedded in reply message and transmitted to the receiver, step 410. Note, in this instance, however, because the attribute value is encrypted, the receiver receives the encrypted value, not a cleartext value. In this way, the receiver relies on a receiving application to provide the decryption. Note too, that in accordance with the policy set, the default may set all hosts and/or users to be "untrusted" and trusted hosts/users identified by an explicit policy. Note that a client may be "untrusted," by policy, if the client is connected to the directory via an "untrusted" network.

If, a host or user is a trusted host/user, it is determined step 414, if the connection is secure. If not, again, the attribute value is incorporated in the reply message in encrypted form, and the receiving application relied upon to perform the decryption.

If, in step 414 the connection is secure, the decryption key is retrieved from the key store, in step 416, and the attribute value, stored in encrypted form, is decrypted in step 418. The cleartext attribute value is returned in the reply message, step 410.

Figure 5:
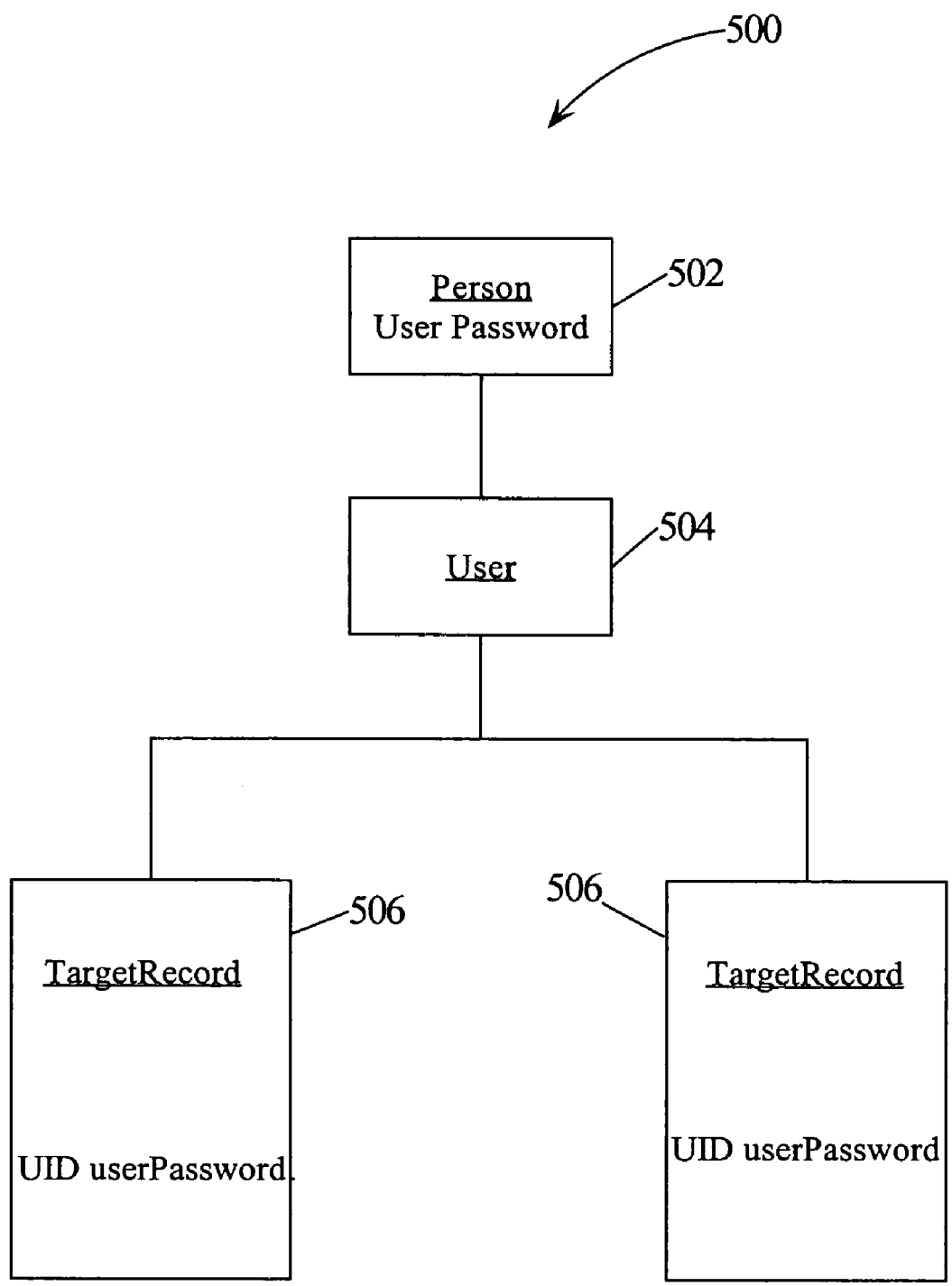
FIG. 5 illustrates an exemplary directory schema which may be used in the embodiment of FIG. 6.

The present invention may be used in conjunction with a global sign-on mechanism. Such a mechanism having an open architecture has been described in the aforementioned commonly owned copending U.S. Patent Application entitled "Open Architecture Global Sign-On Apparatus and Method Therefor," which has been incorporated herein by reference. A methodology for performing such global sign-on operations is described in detail therein. A methodology for using the present invention in conjunction with such operations will be described in conjunction with FIG. 6. Refer now to FIG. 5 which illustrates an exemplary schema portion which may be used in conjunction with the networking of FIG. 6.

FIG. 5, illustrates, in simplified form, a portion 500 of schema which may be used in conjunction with the present invention. For simplicity in describing the present inventive principles, only a subset of the attributes have been shown in FIG. 5. A detailed description of a schema that includes portion 500 may be found in the commonly-owned copending U.S. patent application entitled "Open Architecture Global Sign-On Apparatus and Method Therefor," Ser. No. 09/594,518, incorporated herein by reference.

Schema portion 500 includes a Person class object 502, and a User class object 504. The User object 504 is a child entity of the Person object 502. The User class object 504 is a container class containing user specific information for the subset of users that are enabled for GSO. A User object 504 may include a userType attribute and a userState attribute. The userType indicates the type of user and reflects the access available to the corresponding user. Exemplary values may be, Senior Administrator, Administrator, Middle Tier Server, Full User, and User. These userType attribute values are associated with levels of access to data in the directory. A Full User has access to read and write that user's (the user associated with the corresponding instance of User object), data, including, for example, passwords. Thus, such a user may update its passwords. Users have only read access, and thus, cannot update Directory data. In other words, a User cannot change its password, for example.

Additionally, User derives the commonName attribute ("cn") from the Person class 502. The commonName attribute contains the name of an object, and in the Person class 502, the commonName attribute contains a value corresponding to the name of a person. Thus, in an instance of an Person object class 502 for a given user, the value contained in the commonName attribute corresponds to the name of the given user. The commonName attribute is defined in the standard LDAP user schema, implemented by all LDAP enabled data processing systems. The definition of the LDAP user schema is specified in RFC 2256, entitled "A Summary of the X.500(96) User Schema for Use with LDAPv3", (Copyright 1997, The Internet Society) and hereby incorporated herein by reference. (Attribute types within the standardized LDAP schema typically have a string representation that is an abbreviated mnemonic representation of the attribute type. The attribute name "cn" is an example. Other attributes in accordance with the standard LDAP user schema are found include, for example, a userPassword attribute. Values of the userPassword attribute may be sensitive, as previously discussed, and may be selectively stored in the directory in encrypted form in accordance with the present invention.

A User class object 504 has associated one or more TargetRecord class objects 506. The TargetRecord objects 506 describe the target that a User may launch. An application service resource that a user may access may be represented by an entry in the directory that instantiates a TargetRecord object. A TargetRecord object 506 may contain several attributes including a targetAdapter, uid, and userPassword attribute. The value of the userid (uid) attribute contains a predetermined user identifier string (UID) for the corresponding target. The corresponding user password is the value of the userPassword attribute for the target associated with the TargetRecord object. Note that the value of the TargetRecord object userPassword attribute need not be the same value of the User object userPassword attribute. In other words, the password needed to access a particular resource may be different than the user password used to log onto the network, say, which may be the value of the User object userPassword attribute. And a particular policy set may selectively store one in encrypted form, say the TargetRecord object userPassword attribute value, and not the other. Thus, as described in conjunction with step 404, FIG. 4, the object type may be passed to the policy engine along with the attribute type.

Figure 6:
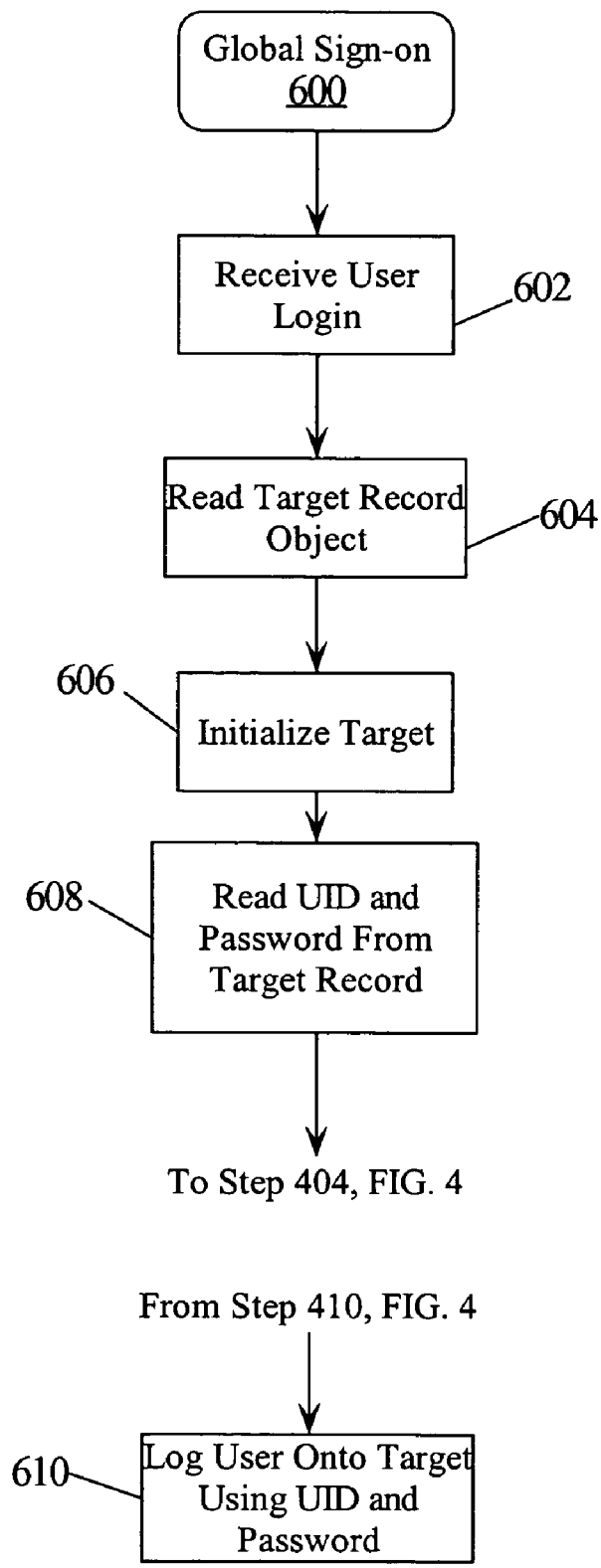
FIG. 6 illustrates, in flowchart form, an alternative methodology for data decryption which may be used in conjunction with the methodology of FIG. 4.

FIG. 6 illustrates, in abbreviated flowchart form, a methodology 600 for adapting such a global sign on mechanism for use with the present invention.

In step 602, the user login message is received. The user login message may include, a user name and password. Additionally, as discussed hereinabove in conjunction with FIG. 5, a directory schema for a global sign-on mechanism may include a target record object that describes the target that a user may launch. In step 604, a target record object for such a service is read, and in step 606 the target is initialized. In step 608, the user ID and password from the target record is read, and passed to the policy engine via step 404, FIG. 4. The attributes and target name are processed as previously described in conjunction with steps 404-418, FIG. 4. The reply message containing the user password retrieved from the target record may be returned either in cleartext or encrypted form, depending on the policy set, as discussed in conjunction with FIG. 4. In step 610, the user is logged onto the target using the UID and password. Note that if the password is delivered in encrypted form, the login application on the target provides the decryption to recover the cleartext password which may then be used to effect the login of the user in accordance with the access control data on the target.

Figure 7:
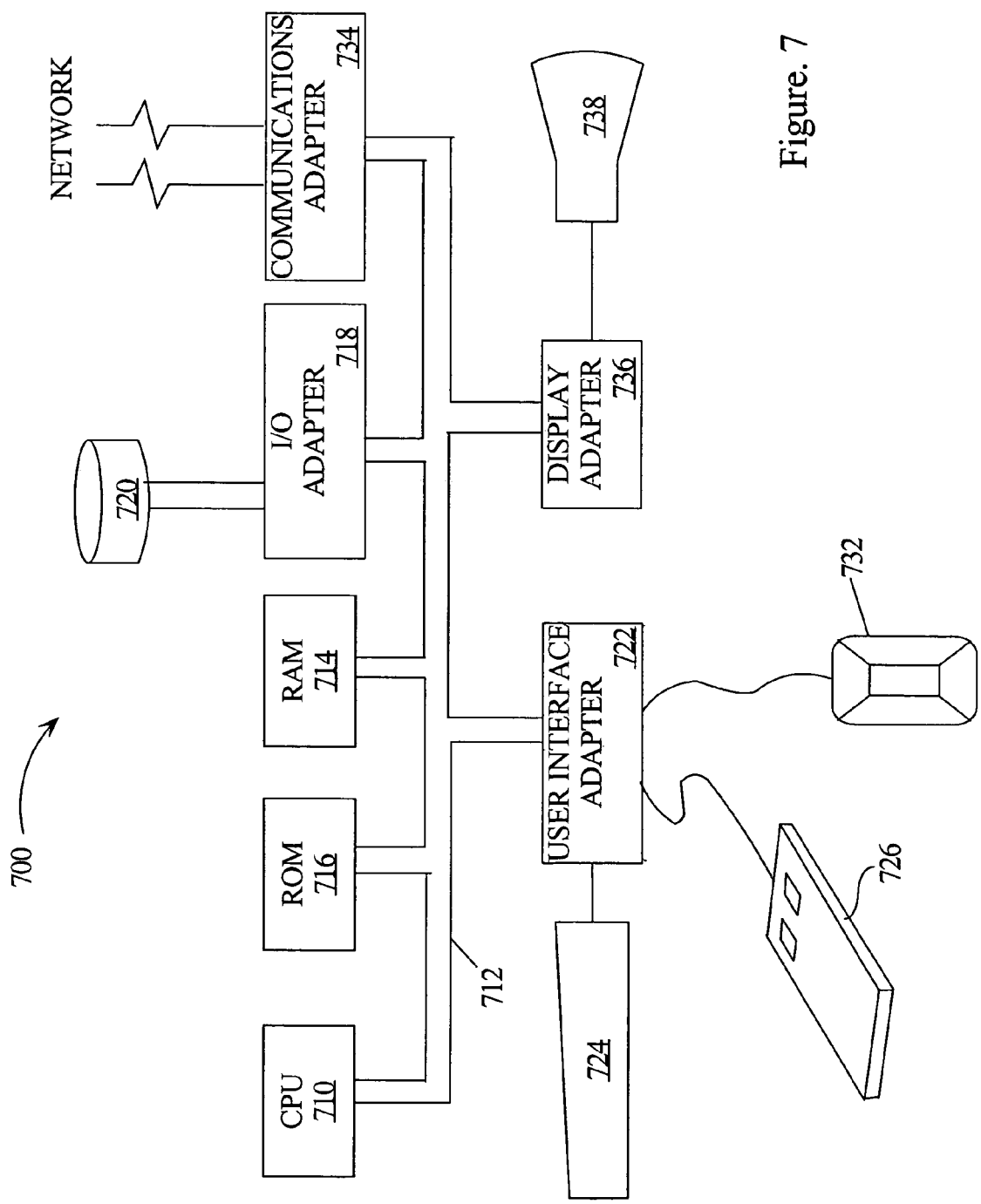
FIG. 7 illustrates, in block diagram form, a data processing system implemented in accordance with an embodiment of the present invention.

FIG. 7 illustrates an exemplary hardware configuration of data processing system 700 in accordance with the subject invention. The system in conjunction with the methodologies illustrated in FIGS. 3-6 may be used, for transparent data encryption in accordance with the present inventive principles. Data processing system 700 includes central processing unit (CPU) 710, such as a conventional microprocessor, and a number of other units interconnected via system bus 712. Data processing system 700 also includes random access memory (RAM) 714, read only memory (ROM) 716 and input/output (I/O) adapter 718 for connecting peripheral devices such as disk units 720 to bus 712, user interface adapter 722 for connecting keyboard 724, mouse 726, trackball 732 and/or other user interface devices such as a touch screen device (not shown) to bus 712. System 700 also includes communication adapter 734 for connecting data processing system 700 to a data processing network, enabling the system to communicate with other systems, and display adapter 736 for connecting bus 712 to display device 738. CPU 710 may include other circuitry not shown herein, which will include circuitry commonly found within a microprocessor, e.g. execution units, bus interface units, arithmetic logic units, etc. CPU 710 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 714 of one or more computer systems configured generally as described above. These sets of instructions, in conjunction with system components that execute them may transparently encrypt and decrypt directory data as described hereinabove. Until required by the computer system, the set of instructions may be stored as a computer program product in another computer memory, for example, in disk drive 720 (which may include a removable memory such as an optical disk or floppy disk for eventual use in the disk drive 720). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

What is claimed is:

1. A method of transparent data delivery comprising:
   receiving data for storage in a database, the database comprising a plurality of object entries representing users, systems and system resources, wherein each object entry of the plurality of object entries comprises an associated attribute value pertaining to the object entity, and the received data is one such attribute value that pertains to one of the object entries;
   determining, in response to a policy corresponding to the received data, one of an encrypted and unencrypted form of storage of the received data;
   if the form of storage of the received data is the encrypted form, encrypting the received data using an encryption key that is based on the policy corresponding to the received data;
   receiving a request for the data;
   determining if the requested data is stored in encrypted form in the database;
   determining if, in response to a policy corresponding to the requested data, a receiver is a trusted client;
   delivering the requested data in unencrypted form if the client is trusted; and
   delivering the requested data in encrypted form if the client is untrusted.

2. The method of claim 1 wherein the data is encrypted using a client-specific key, and further comprising:
   determining if a network coupling the receiver to the database is trusted;
   if both the network is trusted and the client is trusted, performing steps of (i) retrieving the client-specific key from a keystore, (ii) decrypting the requested data stored in encrypted form using the client-specific key, and (iii) delivering the requested data in unencrypted form.

3. The method of claim 1 wherein the database further comprises a schema that defines (i) types of the objects entries that can be stored in the database and (ii) a list of attribute types of each object type, and wherein each of the object entries is associated with an object class and each of the object entries are an instantiation of an object class as defined by the schema.

4. The method of claim 3 wherein the database comprises a directory and the received data comprises an attribute value corresponding to an attribute of a directory object.

5. The method of claim 3 wherein at least one of the policy corresponding to the received data and the policy corresponding to the requested data comprises criteria external to the database, the criteria external to the database including a network address that is usable to identify whether a network is trusted.

6. A method of transparent data delivery comprising:
   determining if requested data requested by a receiver is stored in encrypted form in a database;
   determining if, in response to a policy corresponding to the requested data, receiver is a trusted client;

determining if a network coupling the receiver to the database is trusted;

decrypting and delivering the requested data in unencrypted form if the client is trusted and the network is trusted;

delivering the requested data in encrypted form if the client is untrusted or the network is untrusted;

receiving data for storage in the database;

determining, in response to a policy corresponding to the received data, one of an encrypted and unencrypted form of storage of the received data; and if the form of storage of the received data is determined to be the encrypted form, encrypting the received data in response to an encryption key based on the policy corresponding to the received data.

* * * * *